L. E. SMITH.
WATER FILTRATION AND SUPPLY SYSTEM.
APPLICATION FILED JAN. 15, 1912.
1,026,612.
Patented May 14, 1912.
2 SHEETS—SHEET 1.
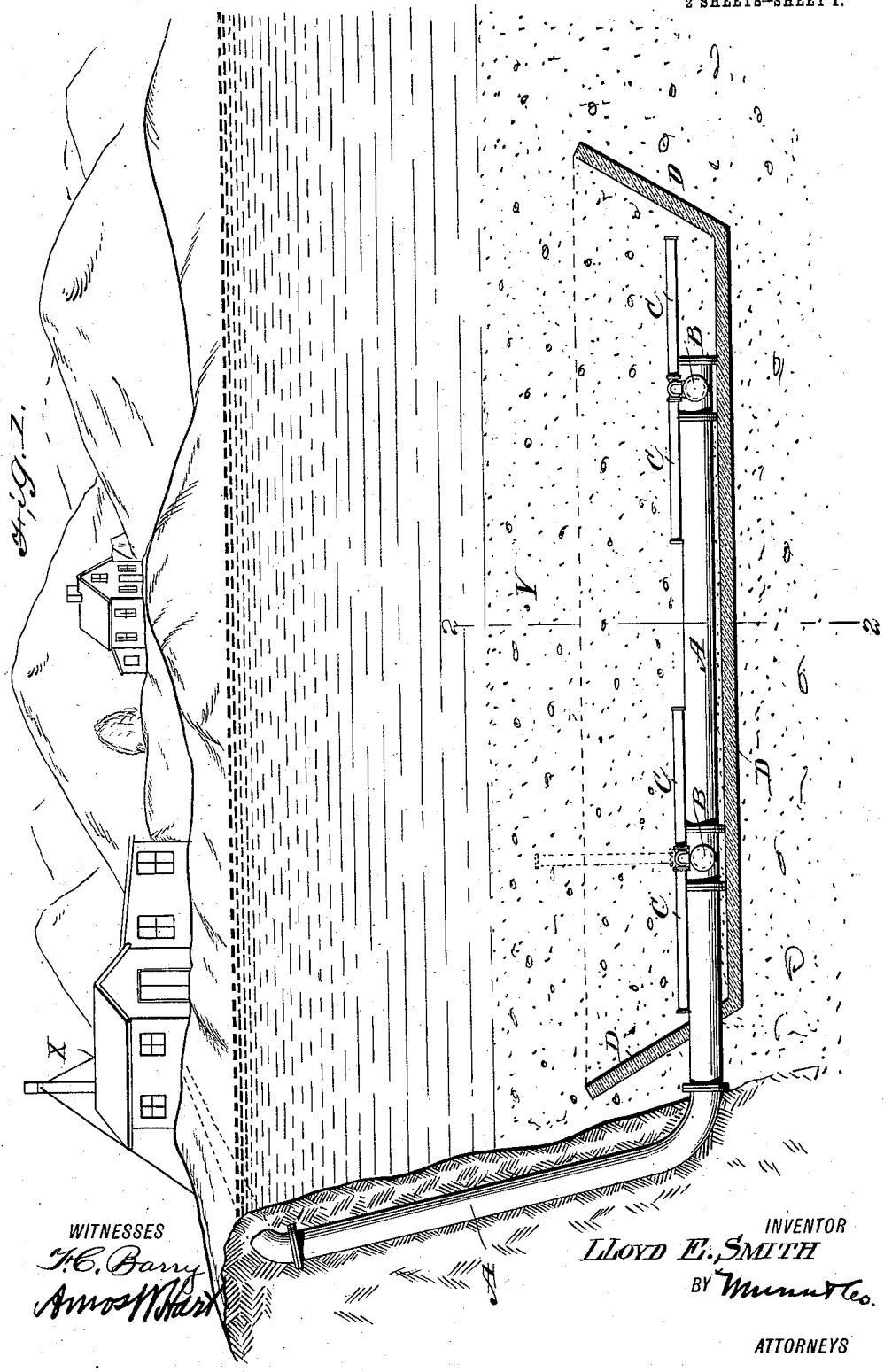
WITNESSES
INVENTOR
LLOYD E. SMITH
BY
ATTORNEYS L. E. SMITH.
WATER FILTRATION AND SUPPLY SYSTEM.
APPLICATION FILED JAN. 15, 1912.
1,026,612.
Patented May 14, 1912.
2 SHEETS—SHEET 2.
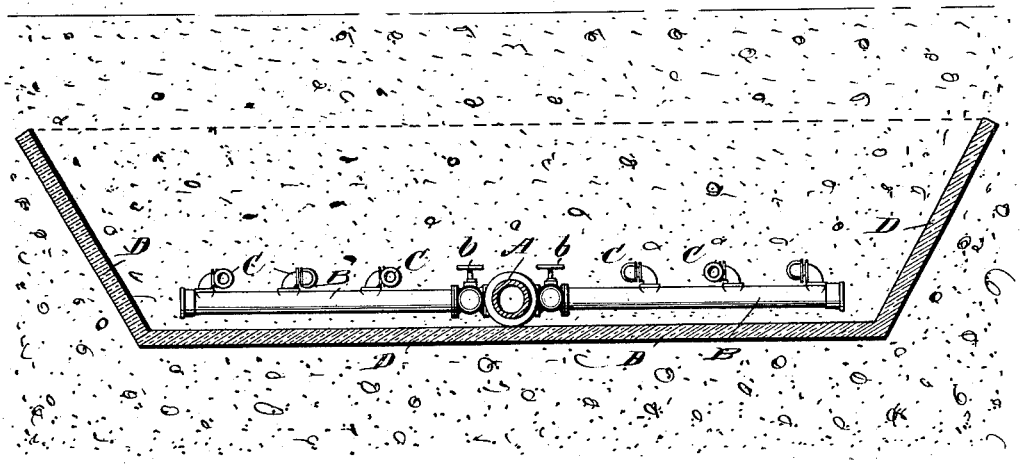
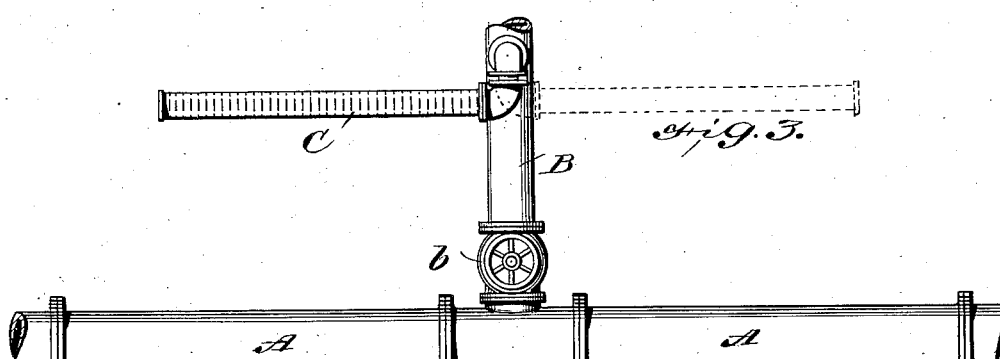
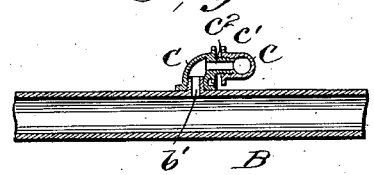
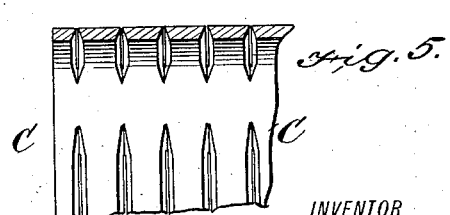
WITNESSES
INVENTOR
LLOYD E. SMITH
BY Munn & Co.
ATTORNEYS

UNITED STATES PATENT OFFICE.

LLOYD E. SMITH, OF CHARLESTON, WEST VIRGINIA.

WATER FILTRATION AND SUPPLY SYSTEM.

1,026,612.

Specification of Letters Patent. Patented May 14, 1912.

Application filed January 15, 1912. Serial No. 671,177.

*To all whom it may concern:*

Be it known that I, LLOYD E. SMITH, a citizen of the United States, residing at Charleston, in the county of Kanawha, State of West Virginia, have invented an Improvement in Water Filtration and Supply Systems, of which the following is a specification.

I have obtained Letters-Patent of the United States, No. 699,032, for an improved system of economic water filtration and supply for towns and cities, in which perforated intake pipes are located in the bed of a river or other stream and buried in sand forming a natural deposit and filtering medium. From such primary intake pipes, delivery pipes are carried up and extended to a pumping station whence the water received at the latter in a pure or filtered condition is forced through mains and service pipes to the several points of delivery in a town or city. In many cases, however, water in the bed of a river or other stream is "hard," owing to the presence of lime or iron, it being received from springs or other supply sources communicating with the bed of the stream. It is, therefore, inexpedient and impracticable to locate and utilize my system of water filtration and supply where such conditions exist. I have in consequence devised a plan and means whereby hard or otherwise objectionable water flowing or rising from a spring in the bed of a stream may be prevented from access to the intake pipe, or mingling with soft water taken from an overlying stratum. In addition to this feature of my invention, I have devised improvements in intake pipe and the connection of its laterals or branches therewith, as hereinafter described.

In the accompanying drawings Figure 1 is in part a diagrammatic view and in part a vertical section showing my improved apparatus arranged as in use. Fig. 2 is a vertical cross section on the line 2—2 of Fig. 1. Fig. 3 is a plan view of the delivery pipe with branches and perforated laterals arranged according to my invention. Figs. 4 and 5 are detail sections to be hereinafter referred to.

A indicates a water delivery pipe extending from the pumping station X, located in the river bank, to a sand-bar, located in the bed of the river. The said delivery pipe is provided with branches B, preferably arranged at right angles thereto and in a horizontal plane, and provided, as shown in Figs. 2 and 3, with valves having hand-wheels $b$, by which the valves may be opened or closed, as required to admit water to the delivery pipe or main A, or cut it off therefrom, as conditions may require. The said branches B are in turn provided with a series of lateral intakes C consisting of strainer pipes which are attached to the branches by peculiar joints, hereinafter described, which permit their adjustment at various angles.

As shown in Figs. 3 and 5, the several intakes C are provided with a series of lengthwise rows of openings forming mere slits in the outer side of the pipe but enlarged on the inner side, this being what is known as "Cook's strainer"; but I propose using any other form of strainer that may be available under the conditions found to exist. By this construction, the entrance of sand is effectively prevented, while water finding entrance through the slits or other openings flows freely, by percolation, into the pipe, as will be readily understood.

In Figs. 1 and 2, the river end or terminal of the main or delivery pipe A is arranged horizontally in the sand-bed Y. As before intimated, water from springs located in the bed of the river is in many cases hard, and in order to cut off the upward flow of such water and prevent its access to the intake pipe, I employ a guard or shield D, which is in the nature of a large tray constructed of hydraulic cement and its side walls preferably extended outward or flared, as shown. The size or diameter of this shield will depend upon conditions, but it is effective for cutting off access of hard water flowing upward from springs below and permeating the lower stratum of the sand underlying the shield, so that softer water flowing in the main current above the sand-bed and permeating the sand stratum above the shield, finds access to the delivery pipe and its connections.

The form of universal joint which I employ for connecting the intake or strainer pipes C with the branches B is constructed as follows: Said branches B are provided with screw-threaded nipples $b'$, see Fig. 4, and to each of these an internally threaded elbow or union $c$ is applied. A similar union $c'$ is applied to the intake or strainer pipe C, and a threaded tube $c^2$ connects the two unions. It is apparent that by this construction, the intake pipe C may be adjusted at any angle, horizontal, vertical, or oblique, as illustrated in Figs. 1 and 3. The form of universal joint described is, moreover, very simple in construction and may be economically manufactured, and it permits the pipes C to be easily and quickly attached to, or detached from, the pipes B.

What I claim is:

1. In a system of water filtration and supply as described, the combination with an intake pipe, of a shield arranged horizontally beneath the same, the two being connected and adapted to be buried in a sand-bed in a body of water constituting a source of supply, as described.

2. In a system of water filtration and supply as described, the combination with an intake pipe and its connections, of a shield constructed in the form of a tray having a closed bottom and sides and open top, and arranged horizontally and buried in a sand-bed, the pipes being arranged directly over the shield, as described.

LLOYD E. SMITH.

Witnesses:
JOHN BELDEN NICHOLS,
JASPER NEWTON HUDSON.

Copies of this patent may be obtained for five cents each, by addressing the "Commissioner of Patents, Washington, D. C."